United States Patent
Yoon et al.

(10) Patent No.: US 7,385,895 B2
(45) Date of Patent: Jun. 10, 2008

(54) METHOD OF DISCRIMINATING OPTICAL DISC TYPE AND APPARATUS THEREOF

(75) Inventors: Yong-seock Yoon, Hwaseong-si (KR);
Byoung-ho Choi, Hwaseong-si (KR);
Soo-yul Jung, Hwaseong-si (KR);
Joong-Eon Seo, Youngin-si (KR);
Dong-jin Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 698 days.

(21) Appl. No.: 10/859,471

(22) Filed: Jun. 3, 2004

(65) Prior Publication Data

US 2005/0052978 A1     Mar. 10, 2005

(30) Foreign Application Priority Data

Jun. 12, 2003    (KR)    ............. 10-2003-0037831

(51) Int. Cl.
*G11B 27/36*   (2006.01)
*G11B 7/00*    (2006.01)

(52) U.S. Cl. .............. 369/53.23; 369/44.29; 369/44.25

(58) Field of Classification Search .......... 369/53.23, 369/53.2, 44.29, 44.25
See application file for complete search history.

(56) References Cited

U.S. PATENT DOCUMENTS

| | | | |
|---|---|---|---|
| 5,903,531 A * | 5/1999 | Satoh et al. ............ | 369/44.29 |
| 5,909,419 A * | 6/1999 | Kamiyama ............. | 369/53.23 |
| 6,424,605 B1 * | 7/2002 | Iida .................... | 369/44.27 |
| 6,449,232 B1 | 9/2002 | Kuwahara et al. | |
| 6,556,302 B2 * | 4/2003 | Ishihara ................ | 356/445 |
| 6,822,935 B1 * | 11/2004 | Park et al. ............. | 369/53.22 |
| 6,822,936 B2 * | 11/2004 | Ono et al. ............. | 369/53.23 |
| 6,868,052 B2 * | 3/2005 | Konno et al. ........... | 369/53.23 |
| 6,970,408 B2 * | 11/2005 | Ono .................... | 369/53.23 |
| 7,046,606 B2 | 5/2006 | Takahashi et al. | |
| 2004/0246846 A1 | 12/2004 | Takahashi et al. | |

FOREIGN PATENT DOCUMENTS

| | | |
|---|---|---|
| CN | 1201937 A | 12/1998 |
| CN | 1216385 A | 5/1999 |
| CN | 1268736 A | 10/2000 |
| EP | 0 862 164 A2 | 9/1998 |
| EP | 0 862 164 A3 | 12/1998 |
| JP | 2000-173162 | 6/2000 |
| JP | 2000-260109 | 9/2000 |
| JP | 2001-243696 | 9/2001 |
| JP | 2002-157751 | 5/2002 |
| WO | WO 03/030157 | 4/2003 |

* cited by examiner

*Primary Examiner*—Thang V. Tran
(74) *Attorney, Agent, or Firm*—Stein, McEwen & Bui, LLP

(57) ABSTRACT

A method of discriminating an optical disc type and an apparatus thereof. The method for an optical disc system of recording and/or reproducing an optical disc that includes an optical pickup having a laser diode, an object lens, and a light receiving device, checks a track error signal while moving the object lens to upward/downward, and discriminates an optical disc type by using the magnitude of the checked track error signal. The method and apparatus discriminate the disc type in the initial stage of focusing where the object lens moves to upward/downward.

33 Claims, 3 Drawing Sheets

METHOD OF DISCRIMINATING OPTICAL DISC TYPE AND APPARATUS THEREOF

CROSS-REFERENCE TO RELATED APPLICATIONS

This application claims the priority of Korean Patent Application No. 2003-37831, filed on Jun. 12, 2003, in the Korean Intellectual Property Office, the disclosure of which is incorporated herein in its entirety by reference.

BACKGROUND OF THE INVENTION

1. Field of the Invention

The present invention relates to a discrimination of an optical disc type, and more particularly, to a method of discriminating an optical disc type, whether an optical disc is a read only disc or a recordable disc, and an apparatus thereof.

2. Description of the Related Art

As the number of optical disc types increases, the number of disc types for an optical disc system to recognize and be compatible with increases. The amount of time for the optical disc system to recognize the optical disc type mounted in the optical disc system determines the performance of the optical disc system.

In a conventional optical disc system of recording/reading a read only disc and/or a recordable disc, the disc type is discriminated by measuring specific signals, which are generated after the start of a focusing control or after the start of a tracking control following the focusing control.

Such a conventional method requires a long time to discriminate the disc type, because the method discriminates the disc type by measuring the specific signals, which are generated after the start of the focusing control following the movement of an object lens in a pickup unit to an upward and/or downward direction, or after the start of the tracking control following the focusing control.

SUMMARY OF THE INVENTION

According to an aspect of the present invention, a method of discriminating an optical disc type quickly and an apparatus thereof is provided.

According to an aspect of the present invention, a method of discriminating an optical disc type with reliability when moving an object lens to upward/downward and an apparatus thereof is provided.

According to an aspect of the present invention, a method of discriminating an optical disc whether the optical disc is a read only disc or a recordable disc in an initial stage of focusing where an object lens moves upward/downward, in an optical disc system of recording/reading a high density disc, and an apparatus thereof is provided.

According to an aspect of the present invention, there is provided a method of discriminating a disc type for an optical disc system of recording and/or reproducing an optical disc that includes an optical pickup having a laser diode, an object lens, and a light receiving device, the method including checking a track error signal while moving the object lens to upward/downward, and discriminating an optical disc type by using the magnitude of the checked track error signal.

The discriminating of the optical disc type includes discriminating whether the optical disc is a read only disc or a recordable disc by using the ratio of the added signal of the light receiving device and the track error signal.

According to another aspect of the present invention, there is provided a method of discriminating a disc type for an optical disc system of recording and/or reproducing an optical disc that includes an optical pickup having a laser diode, an object lens, and a light receiving device, the method including checking a track error signal and a focus error signal while moving the object lens to upward/downward, and discriminating an optical disc type by using the track error signal and the focus error signal.

According to another aspect of the present invention, there is provided a method of discriminating a disc type for an optical disc system of recording and/or reproducing an optical disc that includes an optical pickup having a laser diode, an object lens, and a light receiving device, the method including moving the object lens to upward/downward while oscillating the object lens in internal/outer circumference directions of the disc, detecting an added signal of the light receiving device, a track error signal, and/or a focus error signal, and discriminating an optical disc type by using the added signal of the light receiving device, the track error signal, and/or the focus error signal.

According to another aspect of the present invention, there is provided an apparatus of discriminating an optical disc type for an optical disc system of recording and/or reproducing an optical disc, the apparatus including an optical pickup including a laser diode, an object lens, and a light receiving device, a driving unit including a focus actuator of moving the object lens in the axial direction and a tracking actuator of oscillating the object lens in the radial direction of the disc, a detect unit of detecting an added signal of the light receiving device, a track error signal, and/or a focus error signal, and a controller of discriminating the optical disc type by using the added signal of the light receiving device, the track error signal, and/or the focus error signal.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
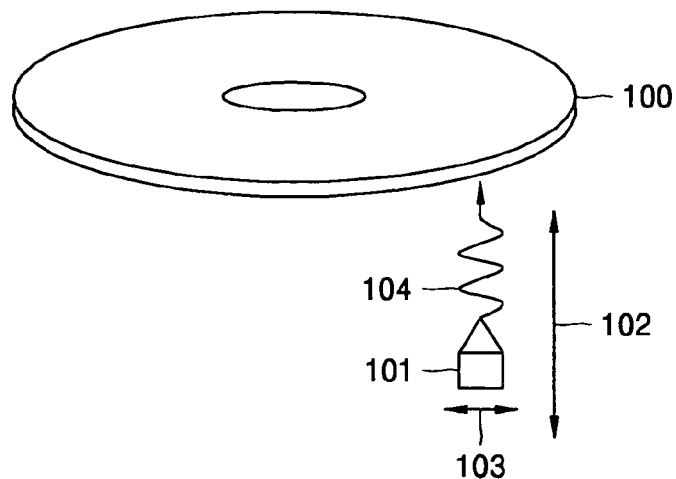
FIG. 1 is a view for explaining the trace of an optical pickup according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a view illustrating the trace of an optical pickup according to an embodiment of the present invention. Referring to FIG. 1, reference numeral 100 denotes an optical disc, reference numeral 101 denotes an optical pickup, which may be referred to as a pickup unit. Reference numeral 102 denotes a trace formed by moving the optical pickup 101 in an upward/downward path, in other words, in an axial direction by using a driving unit (not shown), and reference numeral 103 denotes a trace formed by oscillating the optical pickup 101 toward an internal/outer circumference of the optical disc 100, in other words, in a radial direction by using the driving unit. In addition, reference numeral 104 denotes an actual trace of the optical pickup 101 when moving the optical pickup 101 in the axial direction and oscillating the optical pickup 101 in the radial direction by using the driving unit.

Figure 2:
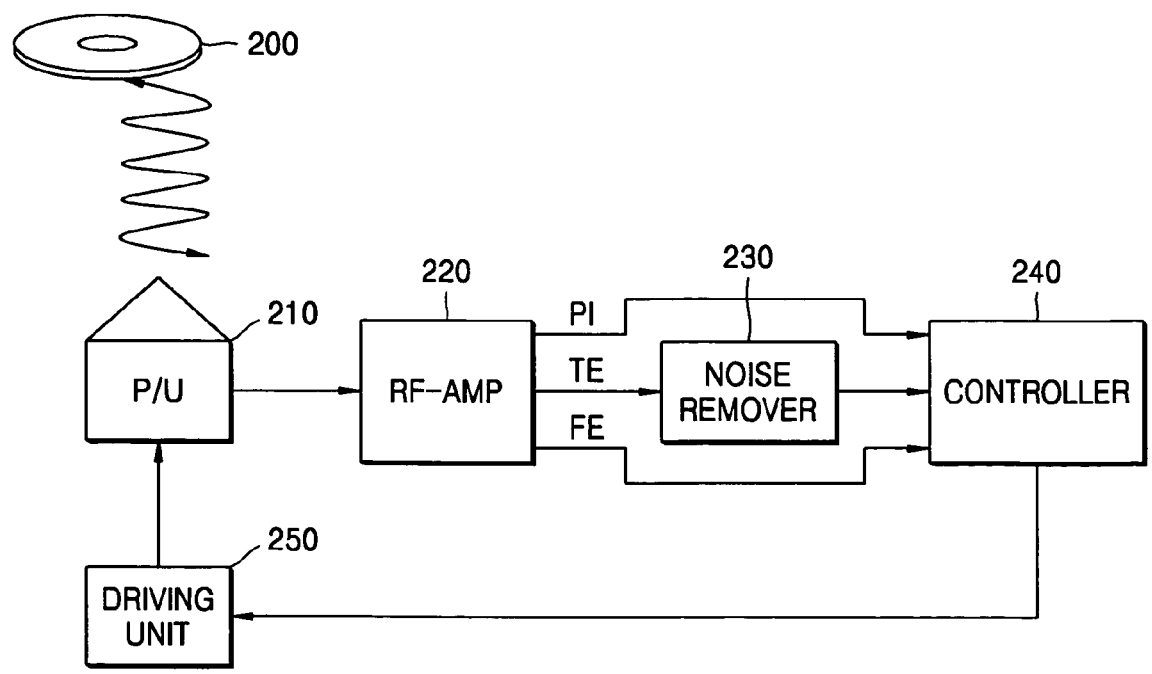
FIG. 2 is a block diagram illustrating an apparatus of discriminating an optical disc type according to an embodiment of the present invention.

FIG. 2 is a block diagram illustrating an apparatus of discriminating an optical disc type according to an embodiment of the present invention. Referring to FIG. 2, the apparatus includes an optical disc 200, a pickup unit (P/U) 210, a reproduction signal amplifier (RF-AMP) 220, a noise remover 230, a controller 240, and a driving unit 250. The apparatus of discriminating the optical disc type according to an embodiment of the present invention may be applied to an optical disc system, which records and/or reads a read only disc and/or a recordable disc.

Referring to FIG. 2, the pickup unit 210 is formed of various well known optical elements which are not individually shown, such as a light emitting device including a short-wavelength laser diode of reading a high density optical disc and a light receiving device including an object lens of a high numerical aperture and a photodiode of detecting a laser beam reflected from the high density optical disc for reading information recorded on the disc 200. The photodiode may include a laser diode and a photodiode that are formed in a module type.

The operation of the pickup unit 210 will now be described. A beam radiated from the pickup unit 210 is focused on a recording surface of the optical disc 200 by passing through the object lens, and the focused beam reads the information recorded on the disc 200. The beam reflected from the disc is converted into an electric signal by the photodiode in the pickup unit 210. The RF-AMP 220 outputs servo control signals and a radio frequency (RF) signal, in other words, a reproduction signal, which detects the information recorded on the optical disc 200 by using the electric signal.

When moving the object lens of the pickup unit 210 in the axial direction, which is an initial stage of focusing, by using the servo control signals, which are a track error signal and a focus error signal, output from the RF-AMP 220, the optical system is able to discriminate the type of the optical disc 200.

In other words, when the optical disc 200 is mounted in the optical disc system, the laser diode in the pickup unit 210 operates and the object lens moves in the axial direction. Here, a focus actuator in the driving unit 250 operates to move the object lens in the axial direction. The object lens is adjustable in order to form the focus of the laser beam radiated from the object lens on the optical disc 200. The driving unit 250 is formed of motors and actuators for moving along a predetermined path on the disc. More specifically, the driving unit 250 includes a focus actuator for moving the object lens in the axial direction, a tracking actuator for oscillating the disc in the radial direction, and a pickup transfer motor, in other words, a sled motor, for moving the pickup unit 210 in the radial direction of the disc 200.

The physical difference between the read only disc and the recordable disc will now be described. In the case of the read only disc, information pits are formed on a surface of the disc in a rotation direction. In the case of the recordable disc, lands and grooves are formed on a surface of the disc in a rotation direction, and data are recorded in the grooves. According to the physical characteristics of the discs, the track error signal generated from the recordable disc is larger than the track error signal generated from the read only disc.

In addition, when an optical photodetector (not shown) of the light receiving device is separated into four channels like A, B, C, and D that denote an upper left channel, an upper right channel, a lower right channel, and a lower left channel, respectively, a push-pull amplifier is used to detect differential output signals of two channels that are referred to as push-pull signals and used as the track error signals TE. Here, the differential output signals of two channels include a signal obtained by subtracting the sum of the two right side photodetector signals from the sum of the two left photodetector signals, in other words, (A+D)−(B+C), and a signal obtained by subtracting the sum of the two left photodetector signals from the sum of two right photodetector signals, in other words, (B+C)−(A+D). The push-pull amplifier may be formed in the RF-AMP 220. In addition, the RF-AMP 220 detects the added signals of the four channels, (A+B+C+D), which is used as a reproduction signal for detecting information, in other words, an RF signal. The added signals of the four channels are collectively referred to as an added signal of the light receiving device PI, and is used for discriminating the disc type.

Accordingly, at the point where the added signal of the light receiving device PI becomes a predetermined level while moving the object lens in the axial direction, in other words, around a focus point, the controller 240 measures the track error signal TE and the added signal of the light receiving device PI to discriminate the disc type based on the ratio of the signals. Here, the optical disc 200 is continuously rotated.

The noise remover 230 is formed as a high pass filter to prevent effects from low frequency noises in the track error signal TE, or may be formed as a band pass filter to prevent effects from high frequency noises.

In order to generate the track error signal TE, the optical beam should cross the tracks. When rotating the disc, the track error signal TE can be detected by the effect of eccentricity; however, the track cross signal cannot be detected twice per rotation of the disc. The controller 240 moves the object lens in the axial direction while oscillating the object lens in the radial direction in order to conveniently detect the track error signal TE, resulting in the discrimination of the disc type at the moment of moving the object lens in the axial direction. Here, the oscillation frequency of the object lens in the radial direction becomes larger than the rotation frequency of the disc to remove the effect of the eccentricity. In addition, the driving unit 250 drives the pickup transfer motor, in other words, a sled motor, which moves the pickup unit 210 in the radial direction of the disc 200, without driving the tracking actuator, which oscillates the object lens in the radial direction. The controller 240 operates as a servo controller, which provides a servo driving signal to the driving unit 250, as well as discriminating the disc type, in the present invention. However, a separate servo controller and discriminating controller may be used.

On the other hand, when the ratio of the added signal of the light receiving device PI and the track error signal TE is measured, the recordable disc has a larger value than the read only disc by several times. Here, the magnitudes of signals including the track error signal TE may vary according to the type of the discs, because the reflected amount of the laser beam is different according to the discs. However, even when the reflected amount of the laser beam is changed, the ratio of the added signal of the light receiving device PI and the track error signal TE is the same. Accordingly, the ratio of the added signal of the light receiving device PI and the track error signal TE is used to reduce the declination due to the disc type. When the ratio of the added signal of the light receiving device PI and the track error signal TE is large, the disc is discriminated as the read only disc. When the ratio of the signals PI, TE is small, the disc is discriminated as the recordable disc. The results are shown in Table 1

TABLE 1

| disc type | read only disc | recordable disc |
| --- | --- | --- |
| magnitude of TE signal | small | large |
| magnitude of PI signal | predetermined magnitude | predetermined magnitude |
| ratio of PI/TE | large | small |
| value of PI/TE | 8.3-11 | 1-2 |

Accordingly, when the disc 200 is mounted in the optical disc system, the controller 240 may discriminate the disc type by using the track error signal TE passed through the noise remover 230 after moving the object lens in the axial direction and moving the object lens or a pickup unit 210 in the radial direction by controlling the driving unit 250. In another case, the controller 240 may discriminate the disc type by using the ratio of the added signal of the light receiving device PI and the track error signal TE as described with reference to Table 1. In still another case, the controller 240 may discriminate the disc type by using the ratio of the track error signal TE and a focus error signal FE. Accordingly, the disc type can be discriminated by using the track error signal TE only, the ratio of the added signal of the light receiving device PI and the track error signal TE, or the ratio of the focus error signal FE and the track error signal TE.

Figure 3:
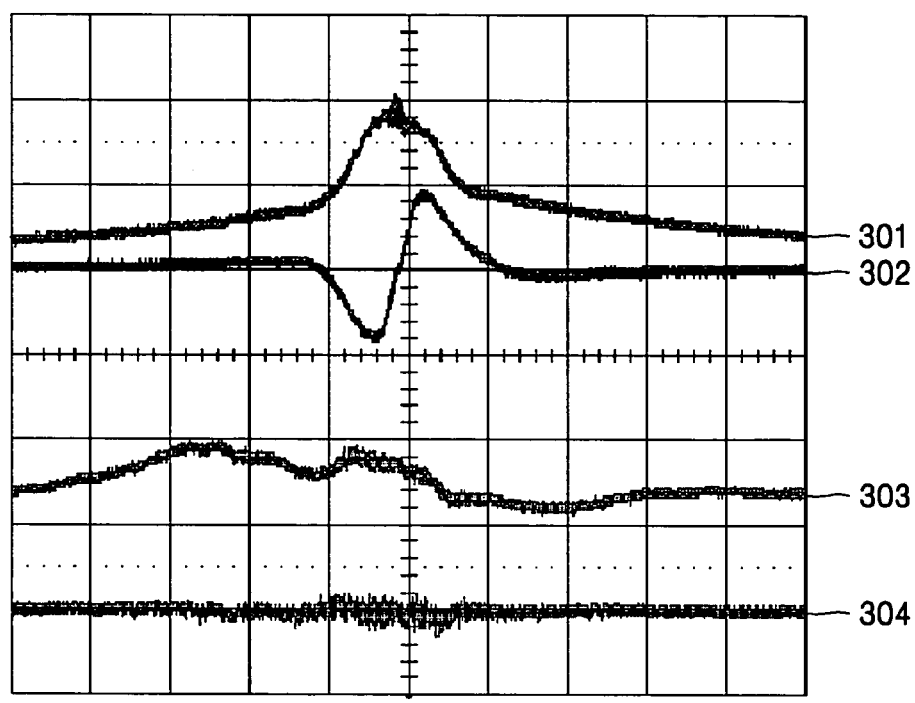
FIG. 3 is a pulse diagram of signals generated from the apparatus of FIG. 2 when a read only disc is mounted in the apparatus.

FIG. 3 is a pulse diagram of signals generated from the apparatus of FIG. 2 when a read only disc is mounted in the apparatus. Here, reference numeral 301 denotes the added signal of the light receiving device PI output from the RF-AMP 220, reference numeral 302 denotes the focus error signal FE output from the RF-AMP 220, reference numeral 303 denotes the track error signal TE output from the RF-AMP 220, and reference numeral 304 denotes the track error signal TE passed through the noise remover 230.

Figure 4:
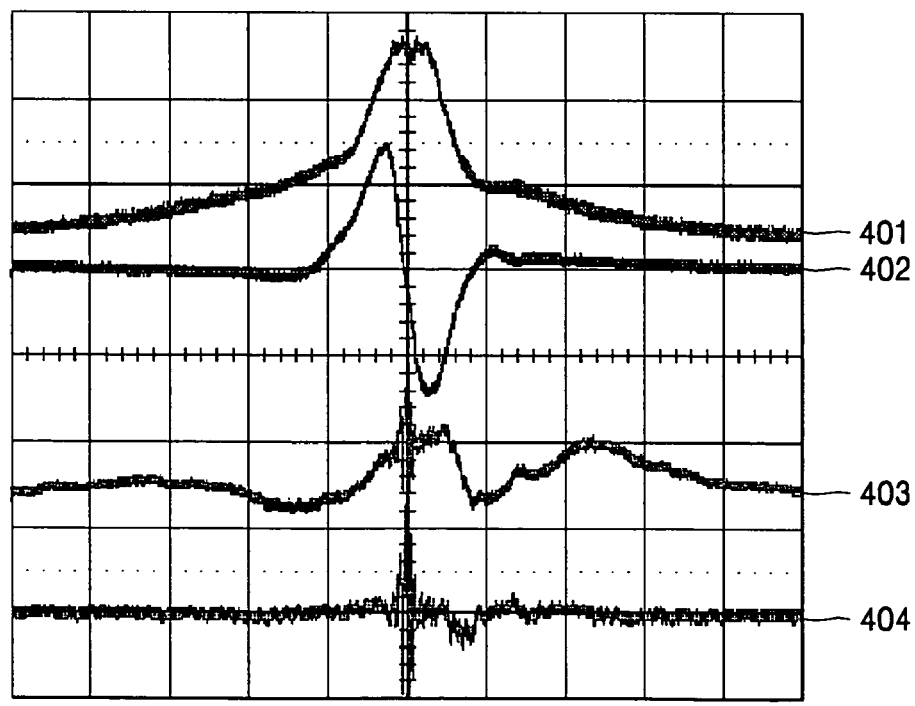
FIG. 4 is a pulse diagram of signals generated from the apparatus of FIG. 2 when a recordable disc is mounted in the apparatus.

FIG. 4 is a pulse diagram of signals generated from the apparatus of FIG. 2 when a recordable disc is mounted in the apparatus. Here, reference numeral 401 denotes the added signal of the light receiving device PI output from the RF-AMP 220, reference numeral 402 denotes the focus error signal FE output from the RF-AMP 220, reference numeral 403 denotes the track error signal TE output from the RF-AMP 220, and reference numeral 404 denotes the track error signal TE passed through the noise remover 230.

Referring to FIGS. 3 and 4, the magnitudes of the added signals of the light receiving device PI 301, 401 and the focus error signals FE 302, 402 are large regardless of the disc type. In the case of the track error signal TE 303, 403, the track error signal TE 403 of the recordable disc is larger than the track error signal TE 303 of the read only disc where the discs are in focus. Accordingly, the disc type can be discriminated by using the track error signal TE only, the ratio of the added signal of the light receiving device PI and the track error signal TE, or the ratio of the focus error signal FE and the track error signal TE.

Figure 5:
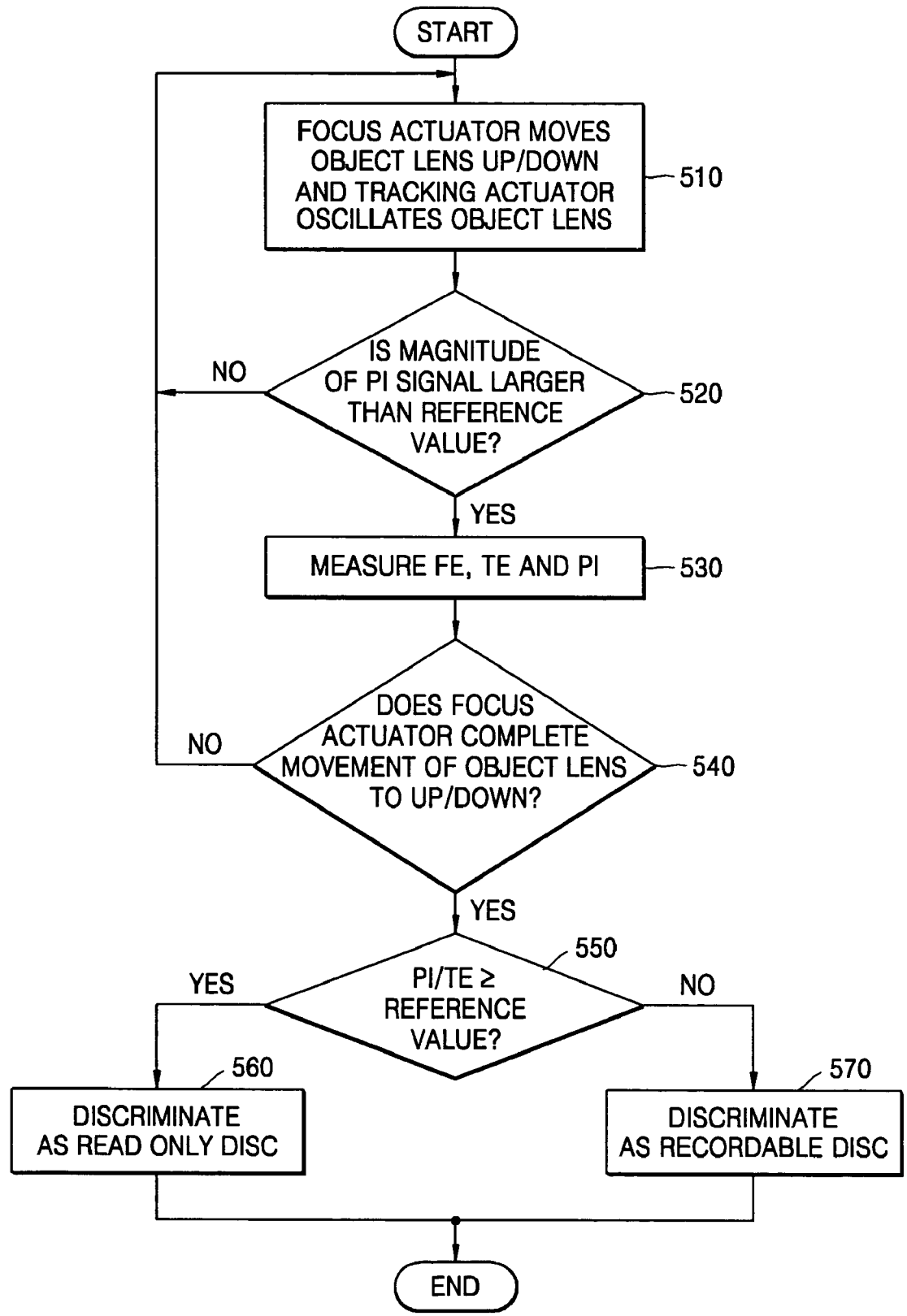
FIG. 5 is a flowchart illustrating a method of discriminating an optical disc type according to an embodiment of the present invention.

FIG. 5 is a flowchart illustrating a method of discriminating an optical disc type according to an embodiment of the present invention that will be described with reference to FIG. 2.

The focus actuator of the driving unit 250 operates to move the object lens in the axial direction, and the tracking actuator operates to oscillate the object lens in the radial direction, in operation 510. In this case, the pickup transfer motor may operate to oscillate the pickup unit 210 in the radial direction of the disc, instead of driving the tracking actuator. Here, the optical disc 200 is continuously rotated.

When the object lens moves in the axial direction and oscillates in the radial direction of the disc 200, it is determined whether the added signal of the light receiving device PI in the pickup unit 210, which is output from the RF-AMP 220, is larger than a reference value, in other words, whether the disc is in an in focus section, in operation 520. When the magnitude of the added signal of the light receiving device PI is larger than the reference value, the magnitudes of the added signal of the light receiving device PI, the focus error signal FE, and the track error signal TE passed through the noise remover 230 in the in focus section are measured, in operation 530. It is determined whether the object lens is moved up to a highest level and down to a lowest level, in operation 540, to check the ratio of the added signal of the light receiving device PI and the track error signal TE, in operation 550. When the object lens has not moved to the highest and lowest levels, the movement of the object lens in the axial direction and the oscillation of the object lens in the radial direction of the disc in operation 510 are repeated. Here, in order to improve the reliability of the discrimination, the operations of moving the object lens up to the highest level and down to the lowest level may be repeated more than once in operation 540, and the disc type is discriminated by using the magnitudes of the added signals of the light receiving device PI, the focus error signals FE, and the track error signals TE passed through the noise remover 230 in operation 550. In order to discriminate the disc type quickly, the disc type may be discriminated by using the magnitudes of the added signal PI, the focus error signal FE, and the track error signal TE passed through the noise remover 230 that are measured after the object lens is moved up to the highest level, in operation 550. In operation 550, the track error signal TE only may be checked, the ratio of the focus error signal FE and the track error signal TE may be checked, or both of the track error signal TE and the ratio of the focus error signal FE and the track error signal FE may be checked.

When the ratio of PI/TE checked in operation 550 is larger than a reference value, the mounted disc is discriminated as the read only disc in operation 560. When the ratio is smaller than the reference value, the mounted disc is discriminated as the recordable disc, in operation 570.

As described above, embodiments of the present invention can discriminate the disc type in the initial stage of focusing where the object lens moves in the axial direction, in the optical disc system of recording and/or reproducing the read only disc and/or the recordable disc. Accordingly, the discrimination period of the disc type is reduced, resulting in the improvement of the performance and the reliability of the optical disc system.

In addition, embodiments of the present invention may be applied to an optical disc system of recording and/or reproducing a read only high density disc and/or a recordable high density disc.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of discriminating a disc type for an optical disc system that includes an optical pickup having a light source to irradiate a light beam, an object lens to convey the light beam irradiated from the light source onto an optical disc, and a light receiving device to receive the light beam reflected from the optical disc, the method comprising:
   checking a track error signal while moving the object lens in an upward and/or downward direction; and
   discriminating an optical disc type by using the magnitude of the track error signal,
   wherein the discriminating of the optical disc type comprises discriminating whether the optical disc is a read only disc or a recordable disc by using a ratio of an added signal of the light receiving device to the track error signal.

2. The method of claim 1, further comprising removing noises from the track error signal and providing the track error signal without noise to discriminate the optical disc type.

3. The method of claim 2, wherein the removing of the noises from the track error signal comprises passing the track error signal through a high pass filter and/or a band pass filter to remove low frequency noises and/or high frequency noises.

4. The method of claim 1, wherein the checking of the track error signal comprises moving the object lens in an axial direction, while oscillating the object lens in a radial direction of the optical disc to check the track error signal where the added signal of the light receiving device becomes larger than a reference value.

5. The method of claim 1, wherein the checking of the track error signal comprises moving the object lens in an axial direction, while moving the optical pickup in a radial direction of the optical disc to check the track error signal where the added signal of the light receiving device becomes larger than a reference value.

6. The method of claim 1, wherein the optical disc continues rotation while checking the track error signal.

7. A method of discriminating a disc type for an optical disc system that includes an optical pickup having a light source to irradiate a light beam, an object lens to convey the light beam irradiated from the light source onto an optical disc, and a light receiving device to receive the light beam reflected from the optical disc, the method comprising:
   checking a track error signal and a focus error signal while moving the object lens in an axial direction of the optical disc; and
   discriminating an optical disc type by using the track error signal and the focus error signal,
   wherein the discriminating of the optical disc type comprises discriminating whether the optical disc is a read only disc or a recordable disc by using a ratio of the focus error signal to the track error signal.

8. The method of claim 7, further comprising removing noise from the track error signal and providing the track error signal without noise to discriminate the optical disc type.

9. The method of claim 8, wherein the removing of the noise from the track error signal comprises passing the track error signal through a high pass filter and/or a band pass filter to remove low frequency noises and/or high frequency noises.

10. The method of claim 7, wherein the checking of the track error signal comprises moving the object lens in the axial direction while oscillating the object lens in a radial direction of the optical disc to check the track error signal where an added signal of the light receiving device becomes larger than a reference value.

11. The method of claim 7, wherein the checking of the track error signal and the focus error signal comprises moving the object lens in the axial direction while moving the pickup in a radial direction of the disc by using a pickup transfer motor to check the track error signal where an added signal of the light receiving device becomes larger than a reference value.

12. The method of claim 7, wherein the optical disc continues rotation while checking the track error signal and the focus error signal.

13. A method of discriminating an optical disc type for an optical disc system that includes an optical pickup having a light source to irradiate a light beam, an object lens to convey the light beam irradiated from the light source onto an optical disc, and a light receiving device to receive the light beam reflected from the optical disc, the method comprising:
   moving the object lens in an axial direction while oscillating the object lens in a radial direction of the optical disc;
   detecting an added signal of the light receiving device, a track error signal, and/or a focus error signal; and
   discriminating the optical disc type by using the added signal of the light receiving device, the track error signal, and/or the focus error signal,
   wherein the detecting of the added signal of the light receiving device, the track error signal, and/or the focus error signal comprises:
      checking whether a magnitude of the added signal of the light receiving device is larger than a reference value which is detected at an initial stage of focus;
      measuring the added signal of the light receiving device, the track error signal, and/or the focus error signal at the initial stage of the focus; and
      determining whether the object lens completed an up and/or down operation once and progressing to the discriminating of the optical disc type when the up and/or down operation is completed.

14. The method of claim 13, further including removing noise from the track error signal and providing the track error signal without noise to discriminate the optical disc type.

15. The method of claim 14, wherein the removing of the noise from the track error signal includes passing the track error signal through a high pass filter and/or a band pass filter to remove low frequency noises and/or high frequency noises.

16. A method of discriminating an optical disc type for an optical disc system that includes an optical pickup having a light source to irradiate a light beam, an object lens to convey the light beam irradiated from the light source onto an optical disc, and a light receiving device to receive the light beam reflected from the optical disc, the method comprising:

moving the object lens in an axial direction while oscillating the object lens in a radial direction of the optical disc;

detecting an added signal of the light receiving device, a track error signal, and/or a focus error signal; and discriminating the optical disc type by using the added signal of the light receiving device, the track error signal, and/or the focus error signal, wherein the discriminating of the optical disc type includes discriminating whether the optical disc is a read only disc or a recordable disc by using a ratio of the added signal of the light receiving device to the track error signal.

17. The method of claim 16, wherein the discriminating of the optical disc type includes alternatively discriminating whether the optical disc is a read only disc or a recordable disc by using a ratio of the focus error signal to the track error signal.

18. The method of claim 16, wherein the moving of the object lens comprises oscillating the pickup in the radial direction of the optical disc by using a pickup transfer motor without oscillating the object lens in the radial direction of the optical disc.

19. The method of claim 16, wherein the optical disc continues rotation while checking the track error signal and the focus error signal.

20. An optical disc system for discriminating an optical disc type of an optical disc, comprising:

an optical pickup including a light source to irradiate a light beam, an object lens to convey the light beam irradiated from the light source onto an optical disc, and a light receiving device to receive the light beam reflected from the optical disc;

a driving unit including a focus actuator to move the object lens in an axial direction and a tracking actuator to oscillate the object lens in a radial direction of the optical disc;

a detect unit arranged to detect an added signal of the light receiving device, a track error signal, and/or a focus error signal; and a controller arranged to discriminate the optical disc type by using at least one of a ratio of the added signal of the light receiving device to the track error signal, a ratio of the focus error signal to the track error signal, or combinations thereof.

21. The apparatus of claim 20, further including a noise remover arranged to remove noise from the track error signal and provide the noise removed track error signal to the controller.

22. The apparatus of claim 21, wherein the noise remover is a high pass filter arranged to remove low frequency noise from the track error signal.

23. The apparatus of claim 21, wherein the noise remover is a band pass filter arranged to remove high frequency noise from the track error signal.

24. The apparatus of claim 20, wherein the controller checks the track error signal where a magnitude of the added signal of the light receiving device becomes lager than a reference value, while controlling the driving unit to move the object lens in the axial direction and to oscillate the object lens in the radial direction of the optical disc.

25. The apparatus of claim 24, wherein the controller discriminates whether the optical disc is a read only disc or a recordable disc by using the ratio of the added signal of the light receiving device to the track error signal.

26. The apparatus of claim 24, wherein the controller discriminates whether the optical disc is a read only disc or a recordable disc by using the ratio of the focus error signal and the track error signal.

27. The apparatus of claim 24, wherein the controller discriminates whether the optical disc is a read only disc or a recordable disc by using the ratio of the added signal of the light receiving device and the track error signal and the ratio of the focus error signal and the track error signal.

28. The apparatus of claim 20, wherein the driving unit continuously rotates the optical disc.

29. An optical disc recording and/or reproducing apparatus detecting a type of an optical disc, comprising:

an optical pickup comprising:
a light source to irradiate a light beam on a surface of the optical disc, and
a photo-detector arranged to detect reflection signals based on the light beam reflected from the surface of the optical disc;

a driving unit arranged to move the optical pickup unit in an axial direction and a radial direction corresponding to the optical disc; and a controller arranged to control the driving unit and to determine a type of the optical disc according to at least one of a first ratio of the reflection signals to a tracking error signal, a second ratio of a focus error signal to the tracking error signal during an initial stage of a focus operation, or combinations thereof when the optical disc is loaded in the recording and/or reproducing apparatus.

30. The apparatus of claim 29, further comprising:
a filter arranged to filter noise from the tracking error signal to allow the controller to determine the type of the optical disc when using the tracking error signal.

31. The apparatus of claim 29, wherein the controller determines the optical disc as a read only optical disc when one of a magnitude of the tracking error signal is small, the first ratio is larger than a reference value, and the second ratio is larger than the reference value.

32. The apparatus of claim 29, wherein the controller determines the optical disc as a recordable optical disc when one of a magnitude of the tracking error signal is large, the first ratio is smaller than a reference value, and the second ratio is smaller than the reference value.

33. The apparatus of claim 29, wherein the controller determines the optical disc as a recordable disc when the first ratio is not larger than the reference value, and determines the optical disc as a read only disc when the first ratio is larger than the reference value.

* * * * *